N. NEWMAN.
Clod-Crusher.

No. 18,351

Patented Oct. 6, 1857.

UNITED STATES PATENT OFFICE.

NELSON NEWMAN, OF SPRINGFIELD, ILLINOIS.

IMPROVEMENT IN SOD-CUTTERS.

Specification forming part of Letters Patent No. 18,351, dated October 6, 1857.

*To all whom it may concern:*

Be it known that I, NELSON NEWMAN, of Springfield, in the county of Sangamon and State of Illinois, have invented a new and Improved Implement or Device which will answer the purpose of a Plow, and also serve as a Sod-Cutter; and I do hereby declare that the following is a full, clear, and exact description of the same, reference being had to the annexed drawings, making a part of this specification, in which—

Figure 1:
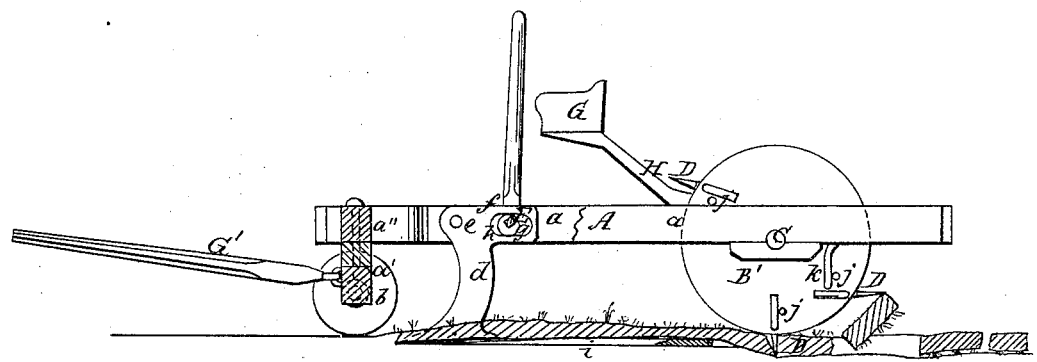
Figure 2:
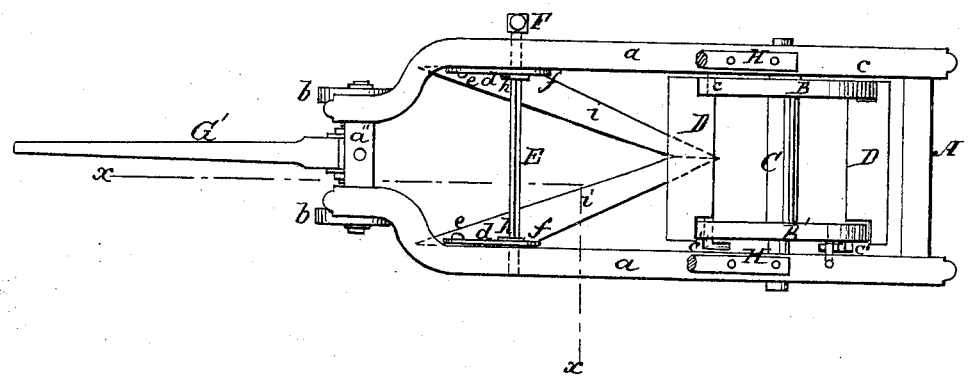

Figure 1 is a side view of my device, a portion of which is bisected longitudinally, as indicated by the line $x\ x$, Fig. 2. Fig. 2 is a plan or top view of the same.

Similar letters of reference indicate corresponding parts in the two figures.

This invention relates to a new and improved implement or device, whereby the sod is first cut and perfectly detached from the subsoil, and then recut into narrow strips and turned over, so that the bottoms of the sods will present a mellow and rich soil to receive the seed, the implement thereby serving as a plow, but operating with a far less expenditure of power than the ordinary plows, and equally if not more efficacious. The implement may also be used merely as a sod-cutter and with a great saving of time and labor, for sods in many parts of the western States, on prairies, are employed for fencing, other materials being scarce, and by this device large quantities of sods may be cut in a very short space of time.

The invention consists in the employment or use of vertical and horizontal cutters, and a cutter wheel or cylinder provided with knives, the parts being arranged to operate conjointly, as will be presently shown and described.

To enable those skilled in the art to fully understand and construct my invention, I will proceed to describe it.

A represents a frame, which is formed of parallel side pieces, $a\ a$, curved inward or toward each other at their front ends, and supported by an axle, $a'$, and a pair of wheels, $b\ b$. The back end of the frame A is supported by two wheels, B B', which are connected or permanently attached to an axle, C.

To the wheels B B' knives D are attached. These knives have journals or pivots $c\ c'$ formed at their inner ends, one at each side, and these pivots or journals pass through the wheels B B', near their edges, the knives being allowed to work freely on their pivots. The pivots $c'$ at one side of the knives pass through the wheel B', and are bent at right angles to the back edges of the knives, as shown plainly in Fig. 2. The knives are merely flat blades of steel, which extend from one wheel to the other, and may be parallel with the axle C or placed obliquely with it, and they should be sufficiently broad to cut through the sod.

To the front part of each side piece, $a$, a vertical cutter, $d$, is attached. The cutting-edges of these cutters may be somewhat curved, as shown clearly in Fig. 1, and their upper ends are pivoted to the inner surfaces of the side pieces, $a$, as shown at $e$, the cutters $d$ being allowed to turn or swing freely on said pivots. The upper end of each vertical cutter $d$ has a horizontal arm, $f$, attached, and an oblong opening, $g$, is made through each arm $f$. (See Fig. 1.)

E is a shaft, which passes through the side pieces, $a\ a$. On this shaft two eccentrics, $h\ h$, are placed, and these eccentrics work within the oblong openings $g\ g$ in the arms $f$. A lever, F, is attached to one end of the shaft E. To the lower end of each vertical cutter $d$ a horizontal cutter, $i$, is attached. The back ends of the cutter are united, and both form a V-shaped cutter, as shown in Fig. 2, the inner edges being the cutting-edges.

G is the driver's seat, which is attached to the upper ends of inclined bars H H, which are secured to the upper surfaces of the side pieces, $a\ a$. (See Fig. 1.) The draft-pole G' is attached to the axle $a'$.

To the outer side of the wheel B' pins $j$ are attached, a pin being near the pivot $c'$ of each knife, (see Fig. 1) and to the side piece $a$ adjoining the wheel B' a pendent rod, $k$, is attached, as shown in Fig. 1.

The operation is as follows: As the machine is drawn along the cutters $i$ pass underneath the sod and detach it from the subsoil, the cutters $d\ d$ making the vertical cuts. The depth of the vertical cuts, and consequently the thickness of the sod, may be regulated by raising or lowering the front end of the frame A in any proper manner. Wedges or blocks may be interposed between the axle $a'$ and crosspiece $a''$, at the front ends of the side pieces. An inclination upward or downward may be given the front ends of the cutters by operating the lever F. This is done by the driver and from the seat G. The sod cut by the cutters $d\ d\ i\ i$ is recut into small pieces by the knives D, which, as the wheels B B' rotate, penetrate and pass through the sod, as shown in red, the knives being held in proper position by the pins $j$, and as the knives ascend at the back sides of the wheels B B' the bent journals $c'$ will strike successively the lower end of the pendent rod $k$, and the knives will be thrown quickly upward, and the sods turned over at the rear of the machine, the grass side being downward. The operation is shown clearly in Fig. 1.

This machine is of easy or light draft, answers the purpose of a plow excellently well, and it may be used simply as a sod-cutter and prove a valuable implement for this purpose in many parts of the western States where sod is used as a fencing material.

Having thus described my invention, what I claim as new, and desire to secure by Letters Patent, is—

The vertical cutters $d\ d$ and the horizontal cutters $i\ i$, in combination with the rotating cutters D, attached to the wheels B B', the whole being arranged to operate conjointly, as shown, for the purpose set forth.

NELSON NEWMAN.

Witnesses:
 N. M. BROADWELL,
 THOMAS LEWIS.